(12) United States Patent
Fieldman et al.

(10) Patent No.: US 10,357,828 B2
(45) Date of Patent: Jul. 23, 2019

(54) METHODS AND LEADING EDGE SUPPORTS FOR ADDITIVE MANUFACTURING

(71) Applicant: GENERAL ELECTRIC COMPANY, Schenectady, NY (US)

(72) Inventors: Zachary David Fieldman, Cincinnati, OH (US); Thomas Sinnett, Cincinnati, OH (US); Daniel Joerger, Cincinnati, OH (US); Neal Dunham, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 537 days.

(21) Appl. No.: 15/041,991

(22) Filed: Feb. 11, 2016

(65) Prior Publication Data

US 2017/0232511 A1 Aug. 17, 2017

(51) Int. Cl.

| B22F 3/105 | (2006.01) |
| B22F 5/10 | (2006.01) |
| B23K 26/342 | (2014.01) |
| B33Y 10/00 | (2015.01) |
| B33Y 80/00 | (2015.01) |
| B23K 101/06 | (2006.01) |

(52) U.S. Cl.
CPC .......... B22F 3/1055 (2013.01); B22F 5/106 (2013.01); B23K 26/342 (2015.10); B33Y 10/00 (2014.12); B33Y 80/00 (2014.12); B22F 2003/1058 (2013.01); B22F 2998/10 (2013.01); B23K 2101/06 (2018.08); Y02P 10/295 (2015.11)

(58) Field of Classification Search
CPC ....................... B22F 2003/1058; B22F 3/1055
See application file for complete search history.

(56) References Cited

U.S. PATENT DOCUMENTS

| 4,863,538 A | 9/1989 | Deckard |
| 5,460,758 A | 10/1995 | Langer et al. |
| 5,529,471 A | 6/1996 | Khoshevis |
| 5,656,230 A | 8/1997 | Khoshevis |
| 5,837,960 A | 11/1998 | Lewis et al. |

(Continued)

FOREIGN PATENT DOCUMENTS

| EP | 2570595 A1 | 3/2013 |
| EP | 3 056 301 A1 | 8/2016 |

(Continued)

OTHER PUBLICATIONS

Extended European Search Report and Opinion issued in connection with corresponding EP Application No. 17155577.4 dated Jul. 3, 2017.

(Continued)

*Primary Examiner* — Colleen P Dunn
*Assistant Examiner* — Jeremy C Jones
(74) *Attorney, Agent, or Firm* — Dority & Manning, P.A.

(57) ABSTRACT

The present disclosure generally relates to methods for additive manufacturing (AM) that utilize support leading edge structures in the process of building objects, as well as novel leading edge support structures to be used within these AM processes. The support structure is positioned adjacent the object between the object and a first side of the powder bed. The support structure has a shape that tapers outward in the direction from the first side to the object.

19 Claims, 5 Drawing Sheets

(56) References Cited

U.S. PATENT DOCUMENTS

| | | | |
|---|---|---|---|
| 5,897,825 A | 4/1999 | Fruth et al. | |
| 6,471,800 B2 | 10/2002 | Jang et al. | |
| 6,995,334 B1 | 2/2006 | Kovacevic et al. | |
| 7,381,921 B2 | 6/2008 | Hagemeister et al. | |
| 7,435,072 B2* | 10/2008 | Collins | B33Y 30/00 425/174.4 |
| 8,470,234 B2 | 6/2013 | Clark | |
| 8,506,836 B2 | 8/2013 | Szuromi et al. | |
| 8,684,069 B2 | 4/2014 | Mottin et al. | |
| 9,188,341 B2 | 11/2015 | McMasters et al. | |
| 2002/0062909 A1 | 5/2002 | Jang et al. | |
| 2009/0255264 A1* | 10/2009 | McMasters | F02K 9/52 60/747 |
| 2012/0113439 A1 | 5/2012 | Ederer | |
| 2013/0071562 A1 | 3/2013 | Szuromi et al. | |
| 2013/0112366 A1* | 5/2013 | Mottin | B22F 5/04 164/494 |
| 2013/0316084 A1 | 11/2013 | Szuromi et al. | |
| 2014/0251481 A1 | 9/2014 | Kroll et al. | |
| 2014/0335313 A1 | 11/2014 | Chou et al. | |
| 2015/0021379 A1 | 1/2015 | Albrecht et al. | |
| 2016/0175932 A1* | 6/2016 | Dimter | B22F 3/1055 419/28 |
| 2016/0221264 A1* | 8/2016 | Doherty | B33Y 10/00 |
| 2016/0222791 A1* | 8/2016 | Rogers | B22F 3/1055 |
| 2016/0243620 A1* | 8/2016 | Butcher | B23P 15/02 |
| 2016/0368224 A1* | 12/2016 | Ooba | B22F 3/008 |
| 2016/0375489 A1* | 12/2016 | Marchione | B22F 3/1055 419/53 |
| 2017/0136539 A1* | 5/2017 | Chou | B22F 3/1055 |
| 2017/0232512 A1 | 8/2017 | Joerger | |
| 2017/0232670 A1 | 8/2017 | Joerger et al. | |
| 2017/0232671 A1 | 8/2017 | Fieldman | |
| 2017/0232672 A1 | 8/2017 | Fieldman et al. | |
| 2017/0232682 A1 | 8/2017 | Alcantara Marte et al. | |
| 2017/0232683 A1 | 8/2017 | Alcantara Marte et al. | |
| 2018/0111334 A1 | 4/2018 | Gold et al. | |

FOREIGN PATENT DOCUMENTS

| | | |
|---|---|---|
| JP | 2015-009495 A | 1/2015 |
| WO | 2010/082331 A1 | 7/2010 |
| WO | WO 2014/071135 A1 | 5/2014 |
| WO | 2015/019070 A1 | 2/2015 |
| WO | 2017/076983 A1 | 5/2017 |

OTHER PUBLICATIONS

Forderhase et al., "Reducing or Eliminating Curl on Wax Parts Produced in the Sinterstation™," 2000 System, (Abstract) pp. 94-100.

Carter Jr. et al., General Electric, "Direct Laser Sintering of Metals", (Abstract), pp. 51-59.

Jacobson et al., "Practical Issues in the Application of Direct Metal Laser Sintering," (Abstract), pp. 728-739.

Machine Translation and Notification of Reasons for Refusal issued in connection with corresponding JP Application No. 2017-020814 dated May 22, 2018.

\* cited by examiner

METHODS AND LEADING EDGE SUPPORTS FOR ADDITIVE MANUFACTURING

INTRODUCTION

The present disclosure generally relates to methods for additive manufacturing (AM) that utilize support structures in the process of building objects, as well as novel support structures to be used within these AM processes.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is schematic diagram showing a cross-sectional view of an exemplary conventional system 100 for direct metal laser sintering (DMLS) or direct metal laser melting (DMLM). The apparatus 100 builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 to maintain the powder at a level 118 and remove excess powder material extending above the powder level 118 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of excess powder by, for example, blowing or vacuuming. Other post processing procedures include a stress release process. Additionally, thermal and chemical post processing procedures can be used to finish the part 122.

During laser sintering/melting processes, the three-dimensional object is subject to numerous stresses due to the recoating of additional layers of powder as the object is built. The present inventors have discovered that certain AM structures tend to experience deformation at the leading edge of the object. In some cases, the deformation may relate to the movement of the recoater arm as it moves past the object being built. In view of the above, it can be appreciated that there are problems, shortcomings or disadvantages associated with AM techniques, and that it would be desirable if improved methods of supporting objects and support structures were available.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the invention relates to a method for fabricating an object in a powder bed, comprising the steps of: (a) irradiating a layer of powder in a powder bed to form a fused region; (b) providing a subsequent layer of powder over the powder bed by passing a recoater arm over the powder bed from a first side of the powder bed; and (c) repeating steps (a) and (b) until the object and at least one support structure is formed in the powder bed, wherein the support structure is positioned adjacent the object toward the first side of the powder bed, the support structure having a shape that tapers outward in the direction of the object. Preferably, the fused region may result from the solidification of melted powder or sintering of the powder.

In another aspect, the present invention involves a method for fabricating an object in a powder bed, comprising the steps of: (a) irradiating a layer of powder in a powder bed to form a fused region; (b) providing a subsequent layer of powder over the powder bed by passing a recoater arm over the powder bed from a first side of the powder bed; and (c) repeating steps (a) and (b) until the object and at least one support structure is formed in the powder bed, wherein the support structure is positioned adjacent a side portion of the object toward the first side of the powder bed, and above a lateral portion of the object with one or more layers of powder separating the support structure and the lateral portion of the object.

The support structures of the present invention may be used with any object that benefits from them. However, the inventors have found that cylindrical objects derive particular benefits from the support structures disclosed herein. The object may also include concentric cylindrical regions, or desirably a first cylindrical region and a second cylindrical portion having different dimensions. In one aspect, the object comprises a cylindrical portion that tapers outward in the vertical direction and the support structure comprises a portion adjacent the cylindrical portion including a corresponding taper to maintain a predetermined amount of powder between the lateral surface of the object and support structure.

In one aspect, the support structure and object are not connected to each other. In one aspect, the support structure may be attached to a support plate. In another aspect, the support structure is formed as a free floating object within the powder bed. Alternatively, or in addition, the support structure may be attached to the object through one or more breakaway structures.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Figure 1:
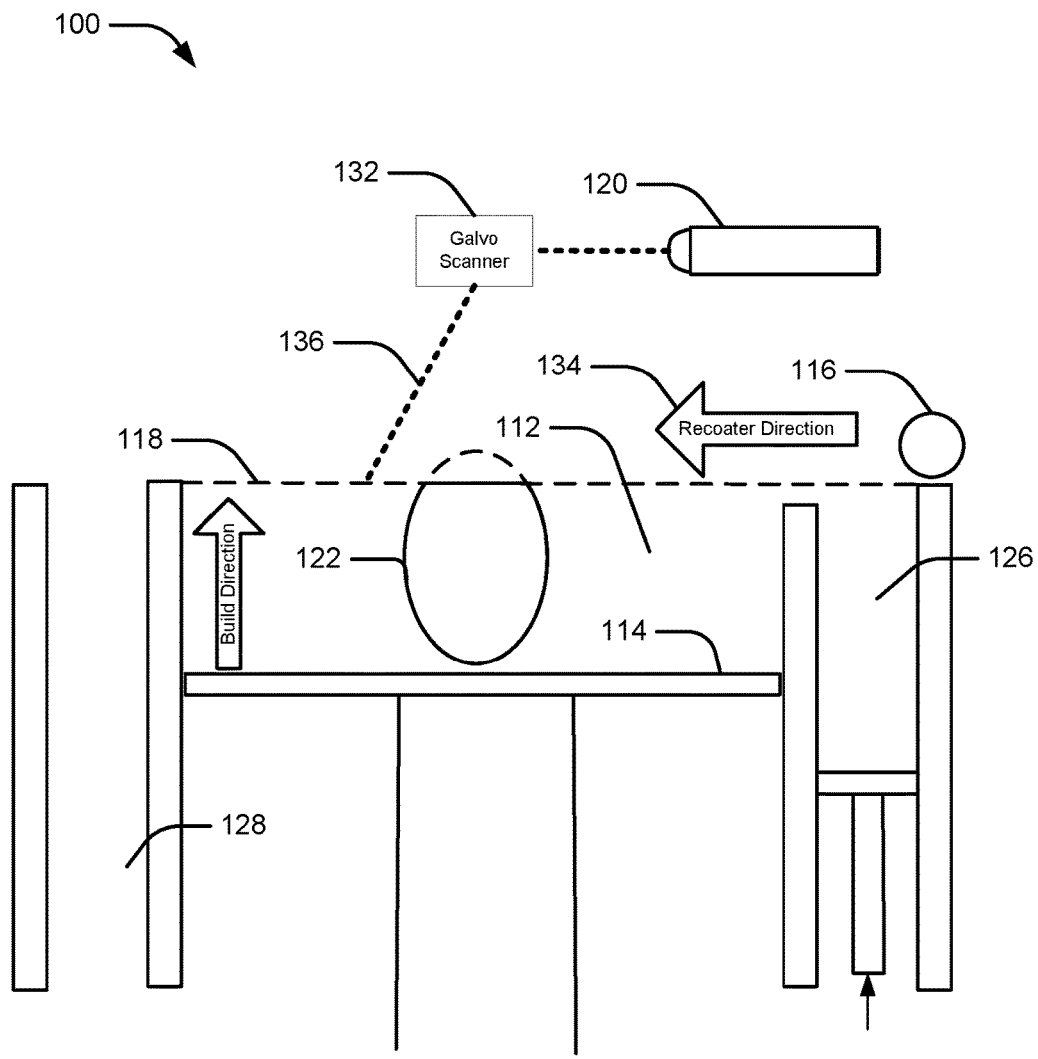
FIG. 1 is schematic diagram showing an example of a conventional apparatus for additive manufacturing.
Figure 2:
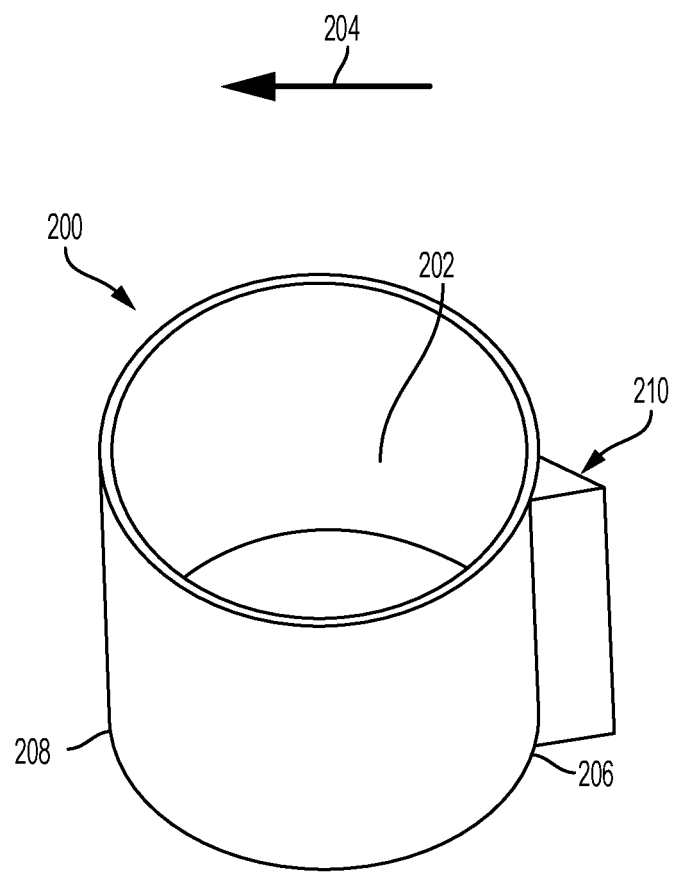
FIG. 2 illustrates a perspective view of an example object and example support structure in accordance with aspects of the present invention.
Figure 3:
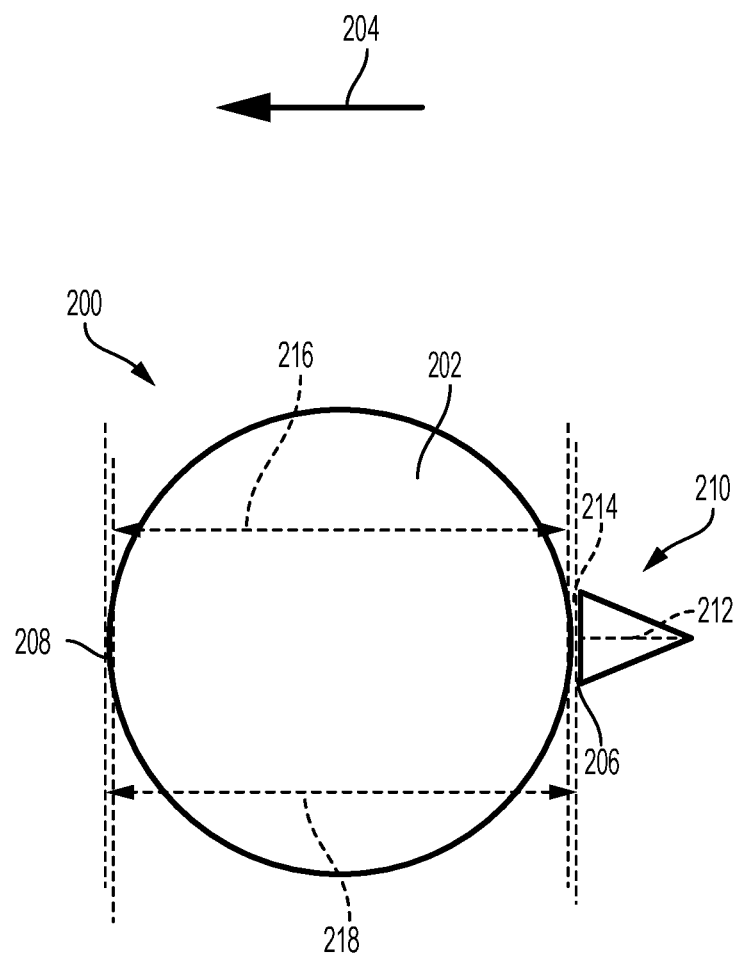
FIG. 3 illustrates a plan view of the object and support structure of FIG. 2.

FIGS. 2 and 3 illustrate an example support structure 210 that can be built alongside an object 200. FIG. 2 illustrates a perspective view and FIG. 3 illustrates a plan view. The support structure 210 and the object 200 may be manufactured according to an AM process. For example, the apparatus 100 of FIG. 1 and method described above may be used. In this type of AM process, the object 200 is built layer-by-layer by selectively sintering or melting areas of the powder in the regions that form the object 200. The support structure 210 is built simultaneously with the object 200 by melting or sintering additional regions of the powder in the location of the support structure 210. The arrows 204 in FIGS. 2 and 3 denote the direction of the recoater arm as it provides a fresh layer of powder at each stage of the object's build. Preferably, the support structure 210 is provided at the leading edge of the object 200 relative to the direction of the recoater arm.

Upon completion of the AM process, the support structure 210 is removed from the object 200. In one aspect, the support structure 210 is attached along with the object to the build plate and may be detached from the build plate and discarded. The support structure 210 may alternatively be formed without attachment to the build plate as a free standing object within the powder bed. In addition, the support structure may include a point of attachment to the object 200 that may be readily broken away once the AM process is complete. This may be accomplished by providing a breakaway structure—a small tab of metal joining the object 200 and support structure 210. The breakaway structure may also resemble a perforation with several portions of metal joining the object 200 and support structure 210.

The removal of the support structure 210 from the object 200 may take place immediately upon, or during, removal of the object from the powder bed. Alternatively, the support structure may be removed after any one of the post-treatment steps. For example, the object 200 and support structure 210 may be subjected to a post-anneal treatment and/or chemical treatment and then subsequently removed from the object 200 and/or build plate.

The present inventors have found that certain objects may benefit from a support structure 210 that widens in the direction of the recoater arm such that the edge adjacent to the object 200 includes a larger dimension than the edge distal to the object 200. In the example aspect illustrated in FIGS. 2 and 3, the support structure 210 has a wedge shape, e.g., an elongated triangular shape having a triangular cross section. However, any shape may be suitable and will vary depending on the particular object being formed. For example, the support structure may have a rectangular shape, oval shape, oblong (e.g., stadium) shape, elliptical shape, crescent shape, teardrop, pie shape, and the like. Generally, a triangular shape provides improved structural support to the object. A triangular shape edge allows load to be gradual spread across large surface rather than contacting whole part at once.

The present inventors have found that support structures 210 are particularly desirable in forming objects 200 that have cylindrical shape. By placing the support structure 210 at the leading edge of the cylinder relative to the direction of the recoater arm, deformation of the cylinder can be reduced and most preferably eliminated. The cylindrical shape may taper outward along the height of the object (in the direction normal to the build plate) and therefore have a wider mouth. In this case, the edge of the support structure adjacent to the cylinder will likewise have a tapered shape to match the shape of the cylinder. Preferably the distal edge of the support structure has a shape that is independent of the taper of the edge adjacent the cylinder, and may be influenced by other portions of the object being built.

As illustrated in FIG. 2, the support structure 210 may generally have a length/height several times its width. For example the aspect ratio of the length/height to width may be from about 15:1 to about 2:1 in one aspect, from about 12:1 to about 4:1 in another aspect, and about 10:1 to about 6:1 in another aspect. That is, the length/height of the support structure may be many times larger than the width. As illustrated in FIG. 2, the object 200 may have a cylinder shape with a hollow center 202. Furthermore, the object may have thin walls, i.e., such that the inner dimension is nearly equal to the outer dimensions. For example, in the case of the illustrated cylinder shape, the ratio of the inner diameter 216 of the cylinder to the outer diameter 218 of the cylinder may be about 1:1.01 to about 1:1.2, about 1:1.05 to about 1.15, or about 1:1.1. Similarly, should the object have the shape of a square or rectangle, the ratio of the inner width to the outer width (and the ratio of the inner length to the outer length) may have the same ratio as provided above. Furthermore, as illustrated in FIG. 2, the object may have an open top and/or an open bottom.

Because the object has a high aspect ratio and thin walls along with one or more open ends, the object may deform the recoating step. In particular, the recoater arm travels in the direction of arrow 204. As the recoater passes across the object from the leading edge 206 to the trailing edge 208 to even out/flatten the top layer of powder in the powder bed, the recoater arm may impart deformation forces onto the leading edge of the object. Thus, a hollow object with thin walls, high aspect ratio, and open ends is particularly benefited by a support structure disposed on the leading edge of the object. Accordingly, as shown in FIGS. 2 and 3, the support structure 210 is positioned at the leading edge 206 of the object 200.

The support structure 210 may extend along a majority of the height of the object 200, up to the entire height of the object 200. For example, the ratio of the height of the object 200 to the height of the support structure 210 may be about 1:0.5 to about 1:1, or 1:0.8 to 1:1. Preferably, the ratio is about 1:1. The ratio of the thickness of the object 200 to the length/width 212 of the support structure 210 (e.g., the distance from the base of triangular cross section to the tip of triangular cross section) may be about 1:8 to about 1:3, about 1:7 to about 1:3.5, about 1:6 to about 1:4, or about 1:5.5 to about 1:4.5. In the case of a different shape for the object, the same ratio may apply to whatever dimension is parallel to the direction of arrow 204 corresponding to the movement of the recoater (e.g., length or width of a rectangle or square).

As best seen in FIG. 3, there may be a gap 214 between the support structure 210 and the object 200. The gap may be filled with unmelted powder. The presence of the unmelted powder still provides a mechanism for the support structure to support the object without requiring a direct connection between the support structure and the object.

While not illustrated, the support structure 210 may further include one more connecting rib integrally connected with the object 200. The connecting ribs would extend from the base of the triangular shape to the outer surface of the object 200. The connecting ribs may be formed incrementally along the height of the support structure 210. The connecting rib may form a breakaway structure that allows removal of the support structure 210 from the object 200 as desired.

Figure 4:
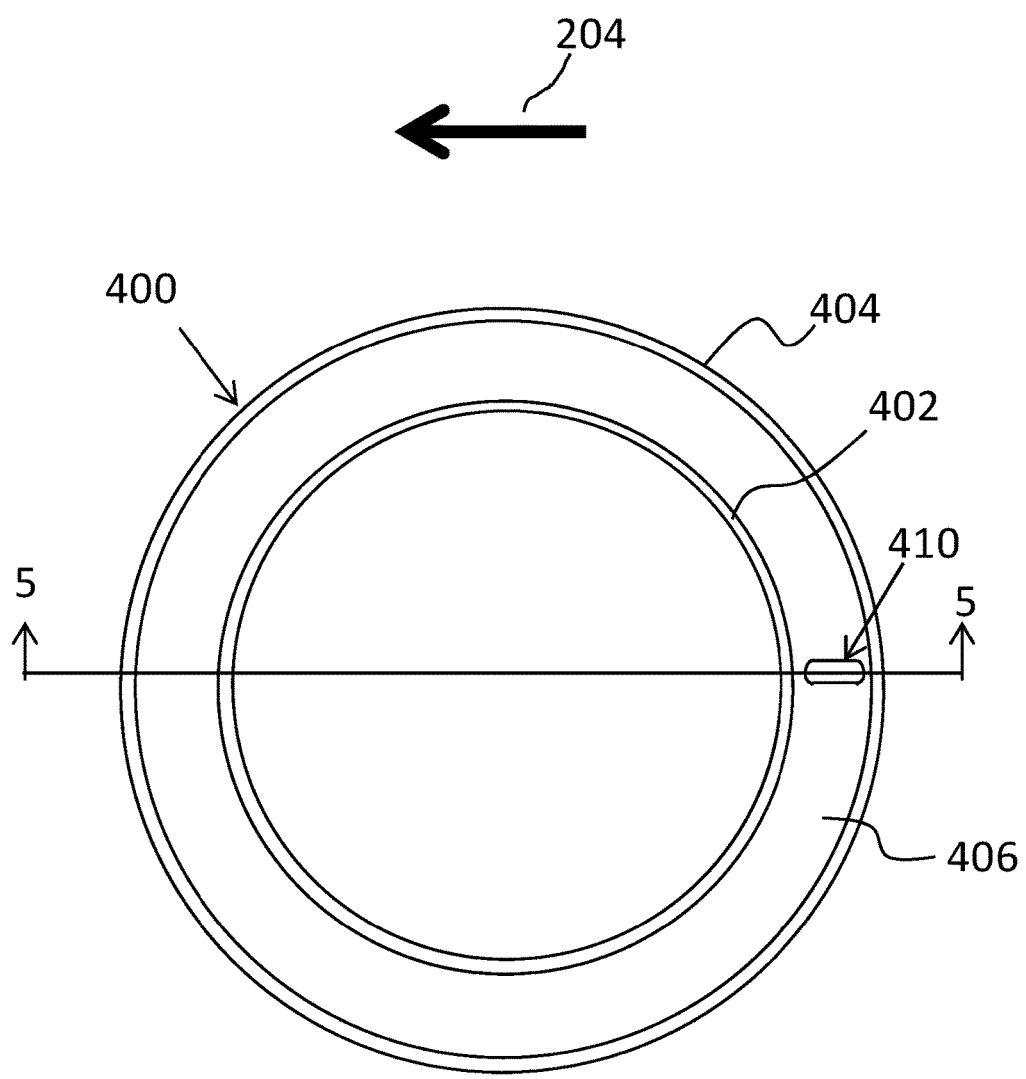
FIG. 4 illustrates a plan view of an object and a support in accordance with aspects of the present invention.
Figure 5:
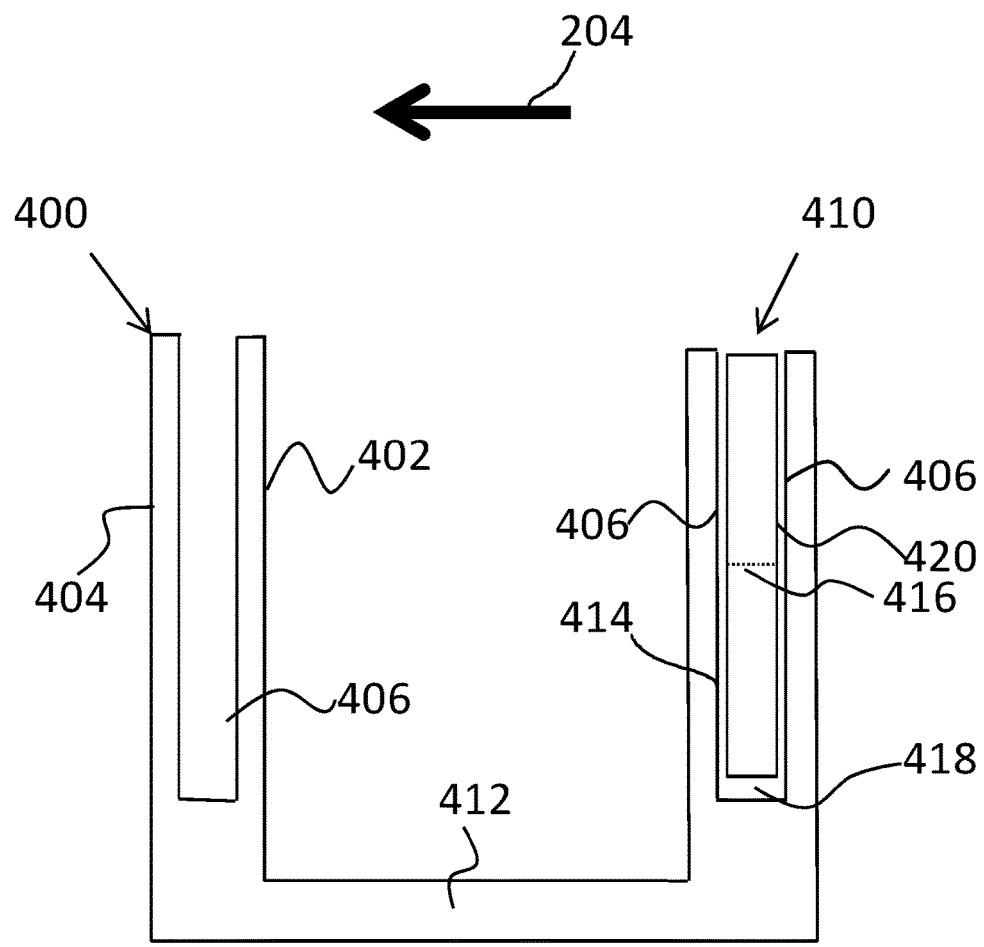
FIG. 5 illustrates a cross-cross sectional view taken along line 5-5 of FIG. 4.

FIGS. 4 and 5 illustrate another example support structure 410 supporting an object 400. FIG. 4 illustrates plan view and FIG. 5 illustrates a cross-sectional view taken along line 5-5 of FIG. 4. The support structure 410 and the object 400 may be manufactured in the same manner discussed above using the apparatus 100 of FIG. 1. In this type of AM process, the object 400 is built layer-by-layer by selectively sintering or melting areas of the powder in the regions that form the object 400. The support structure 410 is built simultaneously with the object 400 by melting or sintering additional regions of the powder in the location of the support structure 410. The arrows 404 in FIGS. 4 and 5 denote the direction of the recoater arm as it provides a fresh layer of powder at each stage of the object's build. Preferably, the support structure 410 is provided at the leading edge of the object 400 relative to the direction of the recoater arm.

Upon completion of the AM process, the support structure 410 is removed from the object 400. As shown in FIG. 5, the support structure 410 is formed as a free standing object within the powder bed. The support structure is formed 410 is formed above a layer of unmelted/unsintered powder 418 between a portion of the object 412 and support structure 410. The support structure may include a point of attachment to the object 400 that may be readily broken away once the AM process is complete. This may be accomplished by providing a breakaway structure—a small tab of metal joining the object 400 and support structure 410. The breakaway structure may also resemble a perforation with several portions of metal joining the object 400 and support structure 410.

The removal of the support structure 410 from the object 400 may take place immediately upon or during removal of the object from the powder bed. Alternatively, the support structure may be removed after any one of the post-treatment steps. For example, the object 400 and support structure 410 may be subjected to a post-anneal treatment and/or chemical treatment and then subsequently removed from the object 400 and/or build plate.

The present inventors have found that certain objects may benefit from a support structure 410 that widens in the direction of the recoater arm such that the edge adjacent to the object 400 includes a larger dimension than the edge distal to the object 400. In the example aspect illustrated in FIGS. 4 and 5, the support structure 410 may have a cylindrical shape of concentric cylinders, e.g., inner 402 and outer 404 cylinders. The inner 402 and outer 404 cylinders may be spaced apart to form a gap/space 406. As illustrated in FIG. 5, the support structure 410 may generally have a length/height several times its width. For example the aspect ratio of the length/height to width may be the same as provided above with respect to the support structure 410. Each of the concentric inner and outer cylinders 402/404 has the may have the same relative dimensions as provided above. Additionally, the object 400 may include a closed bottom portion 412 connecting the inner 402 and outer 404 cylinders. As shown in FIGS. 4 and 5, the support structure 410 is positioned at the leading edge 414 of the object 400. For example, the support structure 410 may be positioned in the space 406 between the inner 402 and outer 404 cylinders.

The present inventors have found that support structures 410 are particularly desirable in forming objects 400 that have cylindrical shape. By placing the support structure 410 at the leading edge of the cylinder relative to the direction of the recoater arm, deformation of the cylinder can be reduced and most preferably eliminated. The cylindrical shape may taper outward along the height of the object (in the direction normal to the build plate) and therefore have a wider mouth. In this case, the edge of the support structure adjacent to the cylinder will likewise have a tapered shape to match the shape of the cylinder. Preferably the distal edge of the support structure has a shape that is independent of the taper of the edge adjacent the cylinder, and may be influenced by other portions of the object being built.

The support structure 410 may extend along a majority of the height of the object 400, up to the entire height of the object 400. For example, the ratio of the height of the object 400 to the height of the support structure 410 may be about 1:0.3 to about 1:0.9, or 1:0.4 to about 1:0.8, or about 1:0.5 to about 1:0.7. The ratio of the thickness of each of the inner 402 and outer 404 cylinders of the object 400 to the length/width 316 of the support structure 410 may be about 1:8 to about 1:3, about 1:7 to about 1:3.5, about 1:6 to about 1:4, or about 1:5.5 to about 1:4.5. In the case of a different shape for the object, the same ratio would apply to whatever dimension is parallel to the direction of arrow 204 corresponding to the movement of the recoater. The support structure 410 may have any variety of shapes including rectangular, triangular, cylindrical, oval, oblong, and the like. The support structure 410 may also include a non-uniform shape, such as having curved surfaces that are congruent to the curved surface of object 400.

As best seen in FIG. 5, there may be a gap 418 between the support structure 410 and the object 400. For example, the gap 418 may be located underneath the support structure 410. The gap 418 may be filled with non-solidified powder. Further gaps 420 may be present along the side surfaces of the support structure 410. These gaps 420 may further be filled with non-solidified powder. The presence of the non-solidified powder still provides a mechanism for the support structure to support the object without requiring a direct connection between the support structure and the object.

While not illustrated, the support structure 410 may further include one more connecting ribs integrally connected with the object 400. The connecting ribs may extend from the outer surfaces of the support object 410 and connect to the surfaces of the inner 402 and outer 404 cylinders. The connecting ribs may be formed incrementally along the height of the support structure 410.

When it becomes necessary to remove the support structure 210/410 from the object 200/400, the operator may apply force to break the support structure free when connecting ribs are present. The support structure may be removed by mechanical procedures such as twisting, breaking, cutting, grinding, filing, or polishing. Additionally, thermal and chemical post processing procedures may be used to finish the object. When no connecting members are present and instead powder has been placed between the object and the support structure during manufacturing, the powder can simply be removed by blowing, for example, using pressurized air. The removal of the support structure 410 from the object 400 may take place immediately upon or during removal of the object from the powder bed. Alternatively, the support structure may be removed after any one of the post-treatment steps. For example, the object 400 and support structure 410 may be subjected to a post-anneal treatment and/or chemical treatment and then subsequently removed from the object 400 and/or build plate.

Although several examples of support structures and objects have been provided, it should be apparent that other objects may be built in accordance with the present disclosure. For example, any object having high aspect ratio and think walls may be supported by one or more of the disclosed support structures. In an aspect, the disclosed support structures are used to manufacture parts for aircraft. For example, a fuel nozzle similar to the one disclosed in U.S. Pat. No. 9,188,341 may be manufactured using support structures disclosed herein.

In an aspect, multiple supports described above may be used in combination to support fabrication of an object, prevent movement of the object, and/or control thermal properties of the object. That is, fabricating an object using additive manufacturing may include use of one or more of: scaffolding, tie-down supports, break-away supports, lateral supports, conformal supports, connecting supports, surrounding supports, keyway supports, breakable supports, leading edge supports, or powder removal ports. The following patent applications include disclosure of these supports and methods of their use:

U.S. patent application Ser. No. 15/042,019, titled "METHOD AND CONFORMAL SUPPORTS FOR ADDITIVE MANUFACTURING" and filed Feb. 11, 2016;

U.S. patent application Ser. No. 15/042,024, titled "METHOD AND CONNECTING SUPPORTS FOR ADDITIVE MANUFACTURING" and filed Feb. 11, 2016;

U.S. patent application Ser. No. 15/041,973, titled "METHODS AND SURROUNDING SUPPORTS FOR ADDITIVE MANUFACTURING" and filed Feb. 11, 2016;

U.S. patent application Ser. No. 15/042,010, titled "METHODS AND KEYWAY SUPPORTS FOR ADDITIVE MANUFACTURING" and filed Feb. 11, 2016;

U.S. patent application Ser. No. 15/042,001, titled "METHODS AND BREAKABLE SUPPORTS FOR ADDITIVE MANUFACTURING" and filed Feb. 11, 2016; and U.S. patent application Ser. No. 15/041,980, titled "METHOD AND SUPPORTS WITH POWDER REMOVAL PORTS FOR ADDITIVE MANUFACTURING" and filed Feb. 11, 2016.

The disclosure of each of these application are incorporated herein in their entirety to the extent they disclose additional support structures that can be used in conjunction with the support structures disclosed herein to make other objects.

Additionally, scaffolding includes supports that are built underneath an object to provide vertical support to the object. Scaffolding may be formed of interconnected supports, for example, in a honeycomb pattern. In an aspect, scaffolding may be solid or include solid portions. The scaffolding contacts the object at various locations providing load bearing support for the object to be constructed above the scaffolding. The contact between the support structure and the object also prevents lateral movement of the object.

Tie-down supports prevent a relatively thin flat object, or at least a first portion (e.g. first layer) of the object from moving during the build process. Relatively thin objects are prone to warping or peeling. For example, heat dissipation may cause a thin object to warp as it cools. As another example, the recoater may cause lateral forces to be applied to the object, which in some cases lifts an edge of the object. In an aspect, the tie-down supports are built beneath the object to tie the object down to an anchor surface. For example, tie-down supports may extend vertically from an anchor surface such as the platform to the object. The tie-down supports are built by melting the powder at a specific location in each layer beneath the object. The tie-down supports connect to both the platform and the object (e.g., at an edge of the object), preventing the object from warping or peeling. The tie-down supports may be removed from the object in a post-processing procedure.

A break-away support structure reduces the contact area between a support structure and the object. For example, a break-away support structure may include separate portions, each separated by a space. The spaces may reduce the total size of the break-away support structure and the amount of powder consumed in fabricating the break-away support structure. Further, one or more of the portions may have a reduced contact surface with the object. For example, a portion of the support structure may have a pointed contact surface that is easier to remove from the object during post-processing. For example, the portion with the pointed contact surface will break away from the object at the pointed contact surface. The pointed contact surface stills provides the functions of providing load bearing support and tying the object down to prevent warping or peeling.

Lateral support structures are used to support a vertical object. The object may have a relatively high height to width aspect ratio (e.g., greater than 1). That is, the height of the object is many times larger than its width. The lateral support structure is located to a side of the object. For example, the object and the lateral support structure are built in the same layers with the scan pattern in each layer including a portion of the object and a portion of the lateral support structure. The lateral support structure is separated from the object (e.g., by a portion of unmelted powder in each layer) or connected by a break-away support structure. Accordingly, the lateral support structure may be easily removed from the object during post-processing. In an aspect, the lateral support structure provides support against forces applied by the recoater when applying additional powder. Generally, the forces applied by the recoater are in the direction of movement of the recoater as it levels an additional layer of powder. Accordingly, the lateral support structure is built in the direction of movement of the recoater from the object. Moreover, the lateral support structure may be wider at the bottom than at the top. The wider bottom provides stability for the lateral support structure to resist any forces generated by the recoater.

Moreover a method of fabricating an object may include consecutively, concurrently, or alternatingly, melting powder to form portions of multiple supports as described above. Additionally, for an object fabricated using multiple supports, the post-processing procedures may include removing each of the supports. In an aspect, a support structure may include multiple supports of different types as described herein. The multiple supports may be connected to each other directly, or via the object. The selection of supports for a specific object may be based on the factors described herein (e.g., shape, aspect ratios, orientation, thermal properties, etc.)

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method for fabricating an object in a powder bed, comprising the steps of:
   (a) irradiating a layer of powder in the powder bed to form a fused region;
   (b) providing a subsequent layer of powder over the powder bed by passing a recoater arm over the powder bed from a first side of the powder bed; and
   (c) repeating steps (a) and (b) until the object and at least one support structure is formed in the powder bed, wherein the object comprises a first portion and a second portion spaced apart along a recoater direction by a horizontal space, and wherein the support structure is positioned at least partially within the horizontal space and contacts the object at one or more locations, the support structure having a shape that tapers outward in the direction from the first side to the object in a plane defined by the layer of powder.

2. The method of claim 1, wherein the object comprises a cylinder shape.

3. The method of claim 2, wherein the fused region results from the solidification of melted powder.

4. The method of claim 2, wherein the fused region comprises sintered powder.

5. The method of claim 1, wherein a gap is formed between the support structure and the object.

6. The method of claim 5, wherein the gap is filled with the powder.

7. The method of claim 1, wherein the object and the support structure have approximately the same height.

8. The method of claim 1, wherein the object is hollow.

9. The method of claim 1, further comprising removing the support structure from the object.

10. The method of claim 1, wherein the support structure has a triangular cross-section.

11. The method of claim 1, wherein the support structure is attached to the object through at least one break-away structure.

12. A method for fabricating an object in a powder bed, comprising the steps of:
   (a) irradiating a layer of powder in a powder bed to form a fused region;
   (b) providing a subsequent layer of powder over the powder bed by passing a recoater arm over the powder bed from a first side of the powder bed; and
   (c) repeating steps (a) and (b) until the object and at least one support structure is formed in the powder bed, wherein the object comprises a first vertical portion, a second vertical portion, and a horizontal portion, and wherein the support structure is positioned adjacent the object to define a first gap being positioned between the first vertical portion and the support structure along a direction of movement of the recoater arm and a second gap being positioned above the horizontal portion and below the support structure along a direction perpendicular to the direction of movement of the recoater arm, wherein a space is defined between the first vertical portion and the second vertical portion, the support structure being disposed within the space.

13. The method of claim 1, wherein the first vertical portion and the second vertical portion are concentric.

14. The method of claim 13, wherein a ratio of the thickness one of the concentric portions of the object to the width of the support structure is about 1:8 to about 1:3.

15. The method of claim 12, wherein the object is hollow.

16. The method of claim 12, further comprising removing the support structure from the object.

17. The method of claim 12, wherein the object comprises a cylindrical portion that tapers outward in the vertical direction and the support structure that comprises a portion adjacent the cylindrical portion including a corresponding taper to maintain a predetermined amount of powder between the lateral surface of the object and support structure.

18. The method of claim 12, wherein the support structure is attached to the object through at least one break-away structure.

19. The method of claim 12, wherein the support structure has a cross-section that is
rectangular, oval, elliptical, crescent, or teardrop shaped.

* * * * *